Nov. 10, 1970  W. S. ROHLAND  3,539,777
DATA SENSING SYSTEM
Filed Jan. 9, 1967  7 Sheets-Sheet 1

INVENTOR
WILLIAM S. ROHLAND

BY Richard H. Smith
ATTORNEY

Nov. 10, 1970  W. S. ROHLAND  3,539,777
DATA SENSING SYSTEM

Filed Jan. 9, 1967  7 Sheets-Sheet 3

United States Patent Office 3,539,777
Patented Nov. 10, 1970

3,539,777
DATA SENSING SYSTEM
William S. Rohland, Rochester, Minn., assignor to International Business Machines Corporation, Armonk, N.Y., a corporation of New York
Filed Jan. 9, 1967, Ser. No. 608,089
Int. Cl. G02b 5/14; G06k 7/10; G08b 5/00
U.S. Cl. 235—61.11                                    4 Claims

ABSTRACT OF THE DISCLOSURE

Mark sensing is performed by an optical scanner having a single light source and a single photodetector. Optical fibers distribute the light to plural sensing channels and also transmit reflected light from each channel to the photodetector. A rotating shutter serializes inputs from the several channels to the photodetector. An area of predetermined reflectivity is included on the shutter just ahead of each sensing aperture so that each data signal from the scanner is preceded by a test signal representing the optical response of the channel which is generating the data signal. The test signals are employed to control the gain of the data signal amplifier in inverse relation to optical response so that the data signals from the different sensing channels are normalized. Marks are detected by sensing the reflectivity thereof and generating an intermediate signal having a magnitude in accordance therewith. A final output signal is generated by increasing the magnitude of the intermediate signal in accordance with the width of the mark above a predetermined minimum width threshold. When two or more marks are detected in an area which should contain only one mark, the mark having the largest final output signal is selected as the most valid mark.

BACKGROUND OF THE INVENTION

This invention relates to a data sensing system and, more particularly, to a system for sensing data marks applied to the surface of a document such as pencil marks made by students on answer sheets to indicate the answers to test questions.

Heretofore, it has been the practice in the automatic test scoring art to employ optical means for detecting marks on answer sheets by analyzing light reflected from the surface of the sheet. Since the reflectivity of a mark is different from that of the document itself, the output from a photodetector receiving the reflected light constitutes a signal which has its amplitude modulated, in accordance with the presence or absence of marks on the sheet. These systems usually employ only reflectivity as the data criteria.

Since in most testing schemes a valid answer consists of one mark and one mark only in a given group of response positions, difficulties are encountered in reflectivity-based sensing systems in distinguishing the valid mark in a given group of response positions when more than one mark is detected therein. This usually results from instances when the student has changed his mind and has failed to completely erase his previous mark. When the photodetector output is compared against some minimum threshold level in an attempt to filter out signals caused by erasures, it is found that when the threshold level is set high enough to filter out the poorest erasures, some valid marks made by light-marking students are also filtered out and when the threshold level is set low enough to pass the lightest valid marks, many erasures also pass through.

The problem is further complicated by the fact that the optical scanners presently used for sensing the marks do not have the same optical response characteristics in each sensing channel. Therefore when, as is usually the case, a different sensing channel of the scanner is employed to sense each of the response positions of a given group, a particular mark might improperly be deemed the most valid or darkest mark since it was detected by a channel having an optical response a little higher than the channel sensing a second mark in the group. To correct such errors it is common to provide manual adjustment means such as potentiometers to control the various parameters governing the optical response of each sensing channel. Through periodic testing and adjustment operations the various sensing channels can be maintained in proper balance. This of course is time consuming and can result in a great deal of costly and unnecessary down time.

OBJECTS AND SUMMARY OF THE INVENTION

It is therefore an object of the invention to provide a mark sensing system having an improved capacity to distinguish valid marks from invalid marks.

Another object is to provide an improved mark sensing system wherein mark width as well as mark reflectivity is employed as a criteria in determining the validity of a mark.

Still another object is to provide a multi-channel optical mark scanner which is constructed so as to minimize channel-to-channel optical response variations.

A further object is to provide a mark sensing system having an electronic channel-to-channel optical response balancing scheme which compeltely eliminates any channel-to-channel imbalance unavoidably inherent in the structural arrangement of the scanner.

In accordance with a first aspect of the invention, means are provided to generate two signals for each mark detected, a first signal being representative of the mark reflectivity and the second signal being representative of the mark width. Further means are provided for composing the two signals into a single final output signal having a magnitude which is a function of both the reflectivity and width of the mark. A further aspect of the scheme inhibits the last-mentioned means from generating the composite final output signal for marks failing to meet a minimum width criteria. In such cases the final output signal is a function of mark deflectivity only. The theory of operation is that the invalid mark in a group will not have both the darkness and width characteristics required to qualify it as a better mark than the valid mark in the group. This, in effect, places more emphasis upon the criteria which a human observer would employ in assessing the comparative validity of the marks.

In accordance with another aspect of the invention a multi-channel optical mark scanner is provided wherein only a single light source and a single photodetector are employed. Optical fibers are employed to distribute light from the single source to the plural sensing channels and are also used to transmit reflected light from the plural channels to the single photodetector. The arrangement of the fibers is such that each sensing channel has an optical path of the same length. A shutter is used to multiplex the inputs from the several channels to the single photodetector.

Yet another aspect of the invention is the provision of a variable gain amplifier for amplifying the output from the photodetector. The gain of the amplifier is set just prior to the receipt of a data signal from the photodetector, means being provided for controlling the gain setting in inverse proportion to the optical response of the sensing channel supplying the data signal, whereby the signals from the various sensing channels are "normalized." The optical response of the channel is determined by means which generate a reference signal preceding each data signal, the reference signal being generated by presenting to the individual channel a test area having a predetermined reflectivity.

The foregoing and other objects, features and advantages of the invention will be apparent from the following more particular description of a preferred embodiment of the invention, as illustrated in the accompanying drawings.

DESCRIPTION OF THE PREFERRED
EMBODIMENT SCANNER

Figure 4:
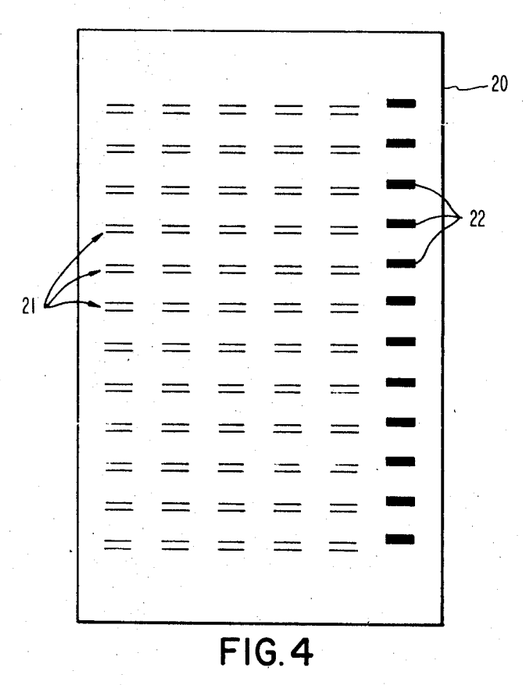
FIG. 4 is a diagram showing one type of answer sheet adapted for use with the illustrated embodiment of the invention.

One type of document or answer sheet designed to be read by the embodiment of the invention herein described is shown in FIG. 4. The document 20 has a plurality of rows 21 of response positions printed on its surface. A row contains five response positions which collectively constitute the total possible answers to a question. To answer a question, the student chooses one and only one of the five choices in a row and marks the document by filling in with a pencil the area between the two lines of the selected response position. Each row of response positions has a timing mark 22 printed approximately even with it along the margin of the sheet. Each timing mark is positioned slightly ahead (in terms of the direction of document travel as it passes beneath the scanner) of its row of response positions. The purpose of this, as is described in detail subsequently, is to enable the scanner to begin searching for marks somewhat prior to the time that the formal response position field arrives beneath the scanner. This enables detection of marks made slightly outside the confines of the response positions per se.

Figure 1:
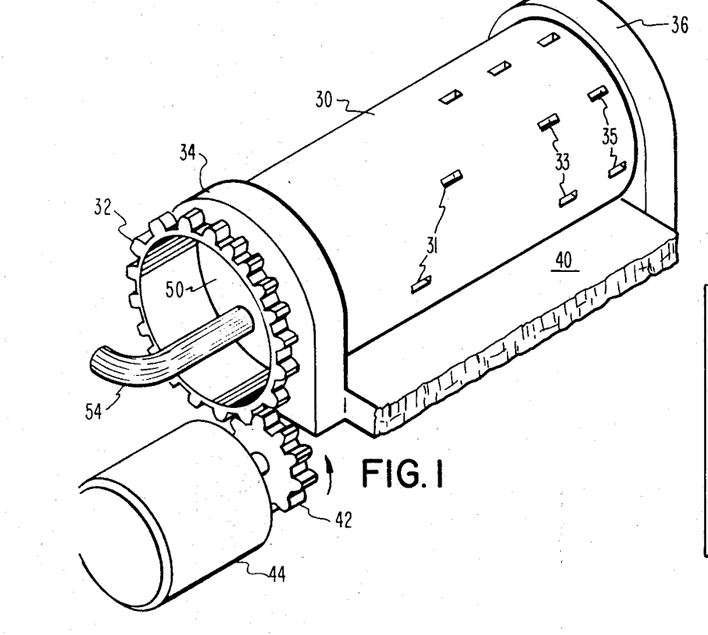
FIG. 1 is a perspective view of a scanner constructed in accordance with certain principles of the invention.
Figure 2:
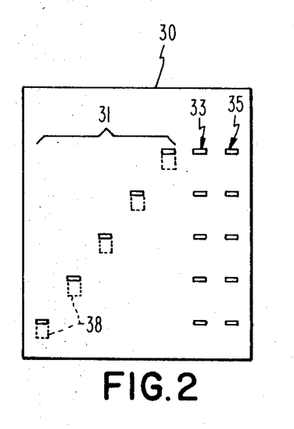
FIG. 2 is a plan view of the cylindrical shutter member of the scanner of FIG. 1, the cylinder having been formed into a flat sheet for the purpose of illustration.
Figure 3A:
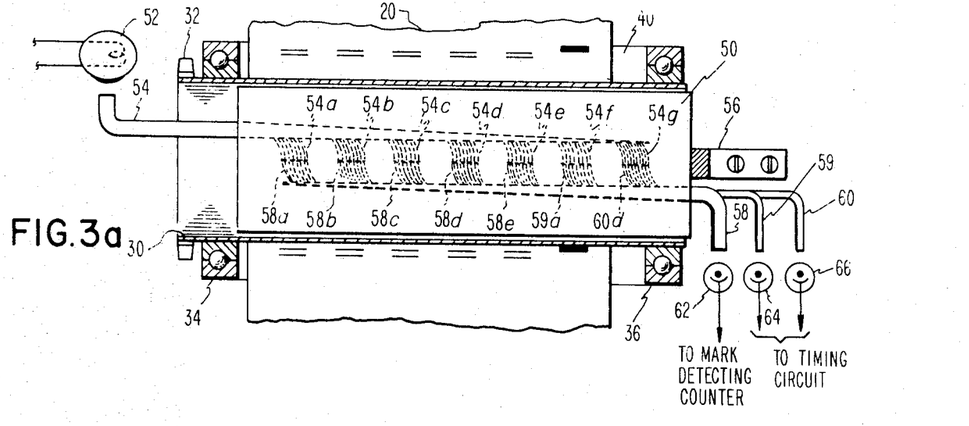
FIGS. 3a, 3b and 3c are partially sectioned plan, front and side elevation views, respectively, of the scanner of FIG. 1.
Figure 3B:
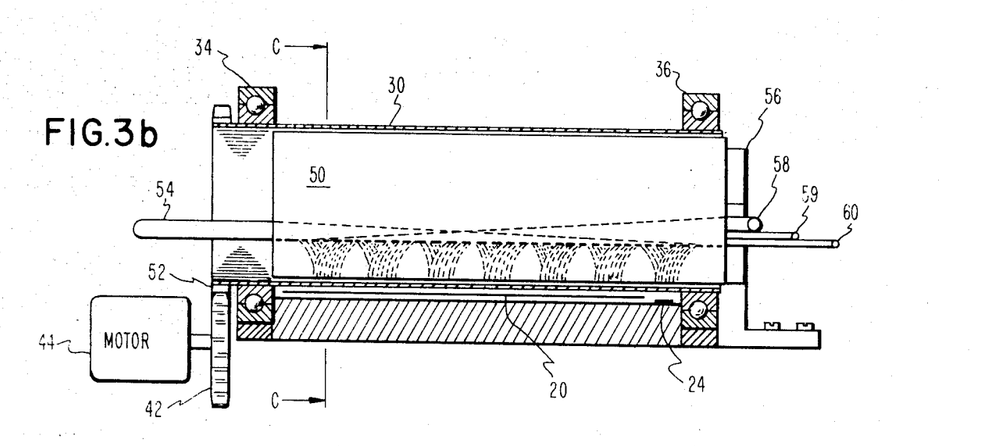
Figure 3C:
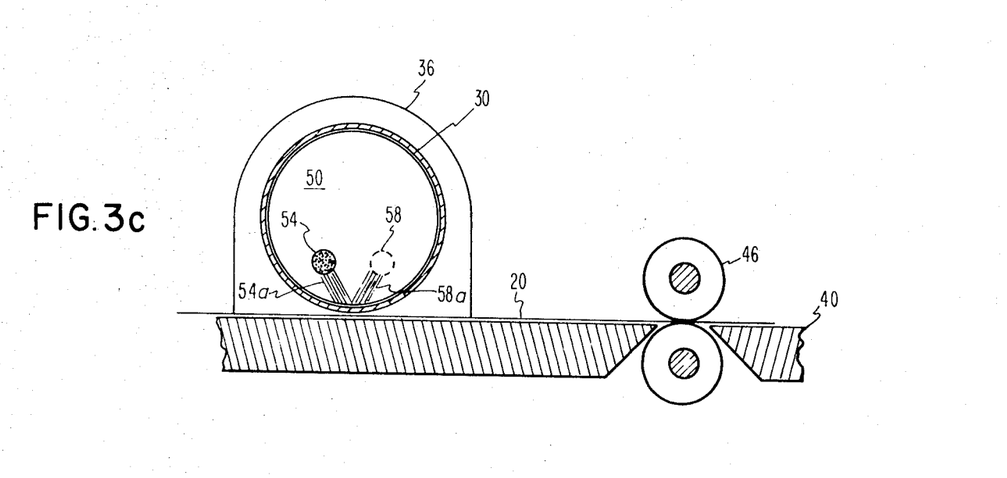

The scanner is shown in FIGS. 1–3. Referring to FIG. 1, a rotatable, thin-walled cylinder 30 is journaled in a pair of bearings 34 and 36 affixed to the document feed plate 40. A spur gear 32 is connected to the left-hand end of cylinder 30 and cooperates with a gear 42 which is driven counterclockwise by a motor 44. In this manner cylinder 30 is rotated in a clockwise direction at constant angular velocity. The cylinder 30 operates as a shutter and contains five sensing apertures 31 aligned with the five columns of response positions on the document 20. Also, the cylinder 30 contains a group of apertures 33 in alignment with the column of timing marks on the document and a group of apertures 35 positioned beyond the margin of document 20 for the purpose of sensing a stationary reflector whereby sync signals are generated, as described subsequently.

As shown in FIG. 2, which illustrates the cylinder 30 in a flattened out condition, the mark sensing apertures 31 are staggered about the circumference of the cylinder. This permits serial scanning of the five response positions of each answer group. A reflective substrate 38 is fixed to the inside surface of cylinder 30 in front of (in terms of the direction of travel of the cylinder) each aperture 31. The purpose of these substrates is explained subsequently. Each mark sensing aperture 31 is horizontally aligned with a timing mark sensing aperture 33 and a sync aperture 35. It can be seen that as the cylinder 30 rotates clockwise, the response positions of each row are sampled in a left to right manner. As will be described in detail subsequently, the rotation velocity of cylinder 30 is relatively high with respect to the feed velocity of document 20 so that each row of response positions is sampled a plurality of times as it passes beneath the scanner.

As shown in FIGS. 3a, 3b and 3c, a stationary cylinder 50 is mounted inside the rotatable cylinder 30. Cylinder 50 is supported at its right-hand end by a bracket 56 anchored to the frame of the unit. Positioned on the left-hand side of the cylinder is a light source 52 and on the right-hand side are a plurality of photodetectors 62, 64 and 66. Extending from light source 52 into cylinder 50 through the left-hand end thereof is a bundle 54 of optical (light conducting) fibers. The right-hand ends of these fibers are divided into seven elongated, approximately rectangular groups 54a, 54b, 54c, 54d, 54e, 54f and 54g. Each group is secured in a rectangular opening in the lower wall of cylinder 50. The seven openings in the cylinder 50 are in registration with the five columns of response positions, the column of timing marks 22 and the stationary sync reflector 24 affixed to the surface of feed plate 40 outside the margin of the document.

A bundle of optical fibers 58 extends from photodetector 62 into cylinder 50 through the right-hand end thereof and terminates in a group of five bundles 58a, 58b, 58c, 58d and 58e. Each of these groups are secured in the opening in the lower wall of cylinder 50 adjacent the groups 54a, 54b, 54c, 54d and 54e, respectively. Light which is emitted from the latter groups and reflected either from the inside surface of cylinder 30 or from the document 20 is channeled by the former groups of fibers to the photodetector 62. A bundle 59 of optical fibers extends from photodetector 64 into cylinder 50 through the right-hand end thereof and terminates in a single group of fibers 59a secured in the opening in the cylinder 50 adjacent the group 54f. Similarly, a bundle 60 of optical fibers extends from photodetector 66 into the cylinder 50 and terminates in a single group 60a secured in the opening in cylinder 50 adjacent the group 54g. Photodetector 62 generates signals which are transmitted to a mark detecting circuit and the photodetectors 64 and 66 generate signals which are transmitted to the timing circuit.

As shown in FIG. 3c, a pair of feed rolls 46 operate to feed the document from right to left on the feed plate 40 underneath the rotating cylinder 30.

Figure 5:
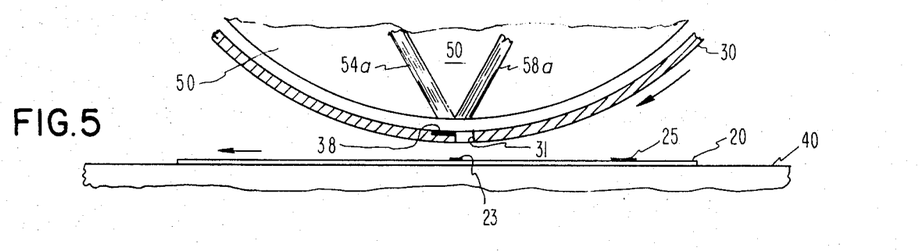
FIG. 5 is an enlarged, side elevation view of a portion of the scanner and illustrates the cooperation between the light input and output members and the shutter member in sensing marks on a document.

The enlarged view of FIG. 5 illustrates the mechanics of the scanning operation. The waveform diagrams of FIGS. 6a, 6b and 6c depict the output from photocell 62 for the different scanning situations when (FIG. 6a) no mark is present on the document as the sensing aperture 31 passes beneath the fiber optic bundles 54a and 58a, when (FIG. 6b) a thin, dark mark 23 is beneath the scanner and (FIG. 6c) when a relatively wide, not-so-dark mark 25 is beneath the scanner.

Figure 6A:
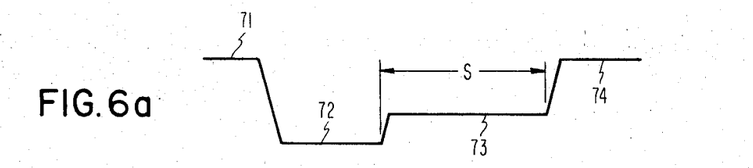
FIGS. 6a, 6b, and 6c are schematic diagrams illustrating the shape of the photodetector output signal in the respective instances when no mark is sensed, when a thin dark mark is sensed and when a wide, not-so-dark mark is sensed.

Referring to FIGS. 5 and 6a, when no aperture 31 is beneath the bundles 54a and 58a, light emitted from the former is reflected by the relatively non-reflective inside surface of cylinder 30 and is channeled by bundle 58a to photodetector 62. Under these conditions the output of the photodetector is maintained at a level 71 representative of the state of least light transmission through the scanning channel. As cylinder 30 advances clockwise, the reflective insert 38 supported on the inside of the cylinder ahead of sensing aperture 31 moves into position beneath the bundles and the output of the photodetector accordingly drops to a level 72 representative of the state of maximum light transmission through the sensing channel. As the aperture 31 passes and exposes the document, the level of light transmission through the channel rises to a level 73 representative of the reflectivity of the document surface (no mark being present). After aperture 31 passes the output from photodetector 62 rises to a level 74 equal to the level 71 representative of the reflectivity of the inside surface of cylinder 30.

Figure 6B:
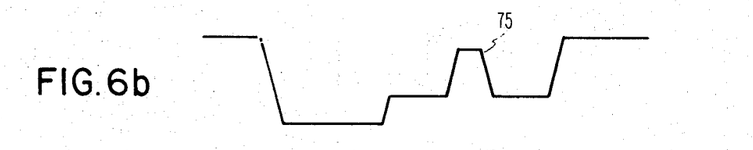

As shown in FIG. 6b, a thin, relatively dark mark, such as mark 23 (FIG. 5), causes the output of photodetector 62 to rise to a level 75 as the mark moves across the field of view presented to bundle 58a by aperture 31. The darker (less reflective) the mark the higher the level 75 will be.

Figure 6C:
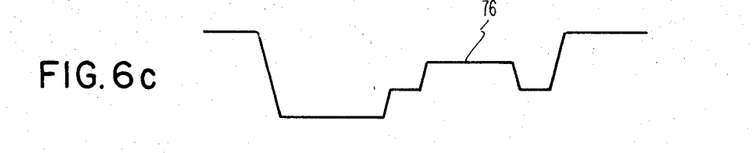

As shown in FIG. 6c, a relatively wide, not-so-dark mark such as mark 25 (FIG. 5), when in position beneath the scanning, causes the output of the photodetector to rise to a level 76 as aperture 31 passes beneath the bundles. Since the mark 25 is more reflective than the mark 23, the level 76 is not as high as the level 75. However, since the mark 25 is wider, it comes into the view of bundle 58a sooner and stays in view longer than the mark 23. Thus, the level 76 is maintained for a longer period of time than the level 75.

As may be appreciated from the above, the reflectivity of the inner surface of cylinder 30 must be constant over the entire area of that surface and is preferably less reflective than the least reflective mark expected to be encountered. Also, the reflectivity of the inserts 38 must be at least as reflective and preferably more reflective than the most reflective document surface expected to be encountered. The reason for this, as will be apparent from the following discussion of the mark detecting circuit, is that the gain of the mark detecting amplifier connected to the output of photodetector 62 is controlled by the peak amplitude of a signal generated in response to the transition from the level 71 (FIG. 6a) to the level 72. If this initial portion of the photodetector output signal is not the most negative portion thereof, then the level 72 will not be effective for gain control purposes. It is also to be noted from FIG. 6a that the data-bearing portion of the photodetector output signal is defined by the width S. S defines the width and timing required of the sync pulses generated by photodetector 66 (FIG. 3a). The size and placement of the reflector 24 (FIG. 3b) and the width of the sync pulse generation apertures 35 in cylinder 30 must therefore be set accordingly.

TIMING CIRCUIT

Figure 7:
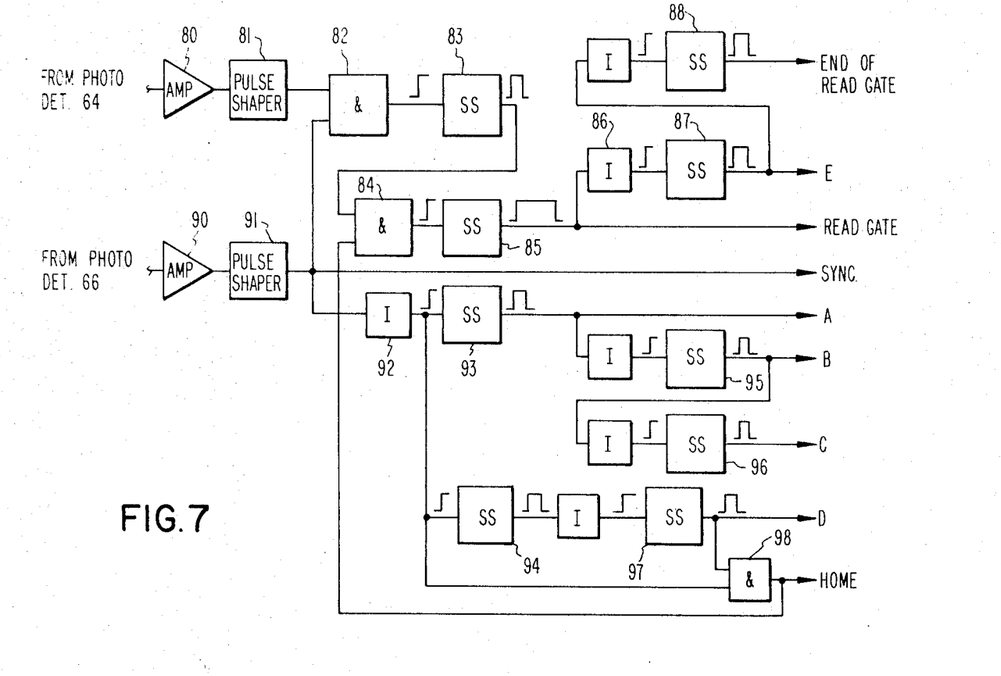
FIG. 7 is a schematic diagram of the timing circuit for generating the signals which control the operation of the mark detecting and output register circuits.

Referring to FIG. 7, the timing circuit which receives the output from photodetectors 64 and 66 and which generates timing pulses to control the operation of the mark detecting and output register circuits is hereinafter described. As shown in FIG. 7, a class A amplifier 90 receives the output from sync photodetector 66, amplifies it and passes it to a pulse shaper 91. The latter clips and squares the pulse to produce the SYNC output signals. These signals, besides being transmitted to the mark detecting circuit, are conveyed to the inputs of an AND circuit 82 and an inverter 92.

The inverted SYNC signal generated by inverter 92 is used to trigger a pair of singleshot multivibrators 93 and 94 and to feed one input of an AND circuit 98. The output of singleshot 93 is a timing signal A. The output of singleshot 94 is inverted and transmitted to the input of a singleshot 97, the output of which constitutes a timing pulse D. As is well known, a singleshot multivibrator responds to a positive transition at its input to produce a positive output signal of a predetermined duration. Thus, when the output from singleshot 94 times out (the output therefrom goes negative), singleshot 97 is activated to produce the signal D. A timing signal B is generated by a singleshot 95 upon the termination of the output from singleshot 93 and an additional timing pulse C is generated by a singleshot 96 upon the termination of the output from singleshot 95. AND circuit 98 responds to positive outputs from inverter 92 and singleshot 97 to produce a HOME signal.

A class A amplifier 80 receives the output signal from timing mark photodetector 64, amplifies it and passes it to a pulse shaper 81. A positive signal issues from pulse shaper 81 each time a timing mark 22 on the document 20 is detected through one of the sensing apertures 33. AND circuit 82 responds to positive outputs from pulse shapers 81 and 91 to trigger a singleshot multivibrator 83. AND circuit 84 responds to positive outputs from singleshot 83 and AND 98 to trigger a singleshot 85. The output of singleshot 85 is the READ GATE signal which is employed to condition the mark detecting circuit for operation.

Figure 10:
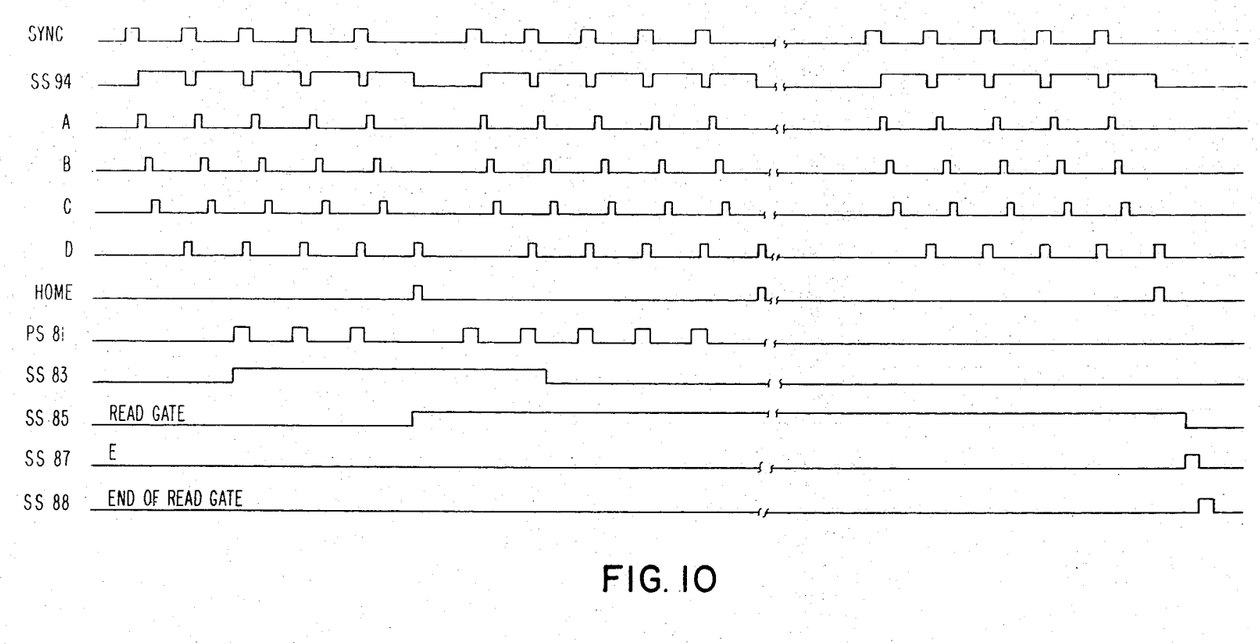
FIG. 10 is a waveform diagram illustrating the relationship of various signals generated by the timing circuit of FIG. 7.

The READ GATE signal is inverted by an inverter 86 and fed to a singleshot 87 which generates a signal E each time the READ GATE signal goes negative. The signal E is inverted and transmitted to a singleshot 88 which generates an END OF READ GATE signal each time signal E goes negative. The sequence of the timing signals is depicted in FIG. 10. The SYNC, A, B, C, D, and HOME signals are continuously generated in the sequence shown regardless of the presence or absence of a document in scanning position. This is because these six timing signals depend for generation only upon rotation of cylinder 30 and have no dependence on the presence or absence of a document or document marks.

The READ GATE signal is generated each time a new timing mark on the document comes into the view of the scanner. The first timing mark signal from pulse shaper 81, which indicates the detection of a new timing mark, triggers singleshot 83 whereupon AND 84 becomes partially conditioned. The occurrence of the next HOME pulse enables AND 84 and triggers singleshot 85, generating the READ GATE signal. The reason that the READ GATE signal is delayed until the occurrence of the first HOME signal following the initial detection of a new timing mark is that it is preferable for the mark detecting circuit, which is conditioned for operation by the READ GATE signal, not to begin looking for data marks in the middle of a scanning cycle.

The length of the READ GATE signal determines the length of time that the mark detecting circuit is active in looking for data marks in a given row of response positions. Since the READ GATE signal goes positive at substantially the time that each new timing mark comes into the view of the scanner, the mark detecting circuit is activated somewhat prior to the time that the row of response positions actually arrives in scanning position and remains active until somewhat after the row departs from the view of the scanner. This assures detection of data marks which have been carelessly or otherwise made outside the actual bounds of the response positions.

As will become apparent from the subsequent discussions of the mark detecting and output register circuits, each group of five SYNC pulses causes the mark detecting circuit to sample each of the five response positions in a row. The first SYNC signal of a group causes the mark detecting circuit to sample the leftmost response position of the row, the second SYNC pulse of the group causes the mark detecting circuits to sample the second from left response position in the row, etc. As is noted from FIG. 10, the frequency of the SYNC pulses is such that each row of response positions is sampled a plurality of times as the document moves past the scanner. The number of times which each row is sampled (i.e., the repetition rate of the SYNC pulses) is dependent upon the width of the narrowest data mark which is expected to be encountered. The rep rate of the SYNC pulses must thus be such that the narrowest expected mark could not move completely through the field of view of the scanner during the time between samplings of the same response position. In practice it is found that at least four or five samples of each response position is sufficient to prevent this. Of course, any number of samples can be obtained through adjustment of the relative velocity of the cylinder 30 with respect to the document feed velocity.

MARK DETECTING CIRCUIT

Figure 8:
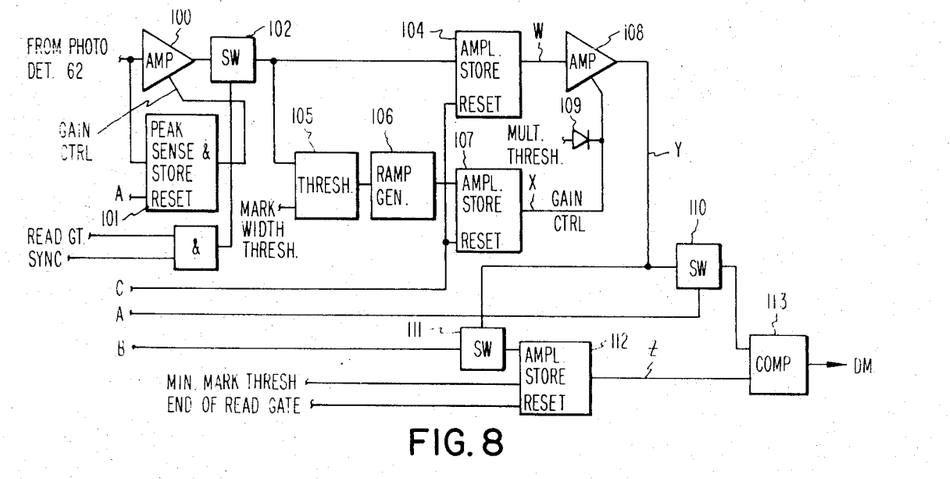
FIG. 8 is a schematic diagram of the mark detecting circuit.

The mark detecting circuit is shown in FIG. 8. The output from photodetector 62 is transmitted to the input of a class A, variable gain amplifier 100 and to the input of a negative peak sensing and storage circuit 101. As previously described in connection with FIG. 6, the output signal from photodetector 62 comprises a succession of negative pulses embodying, in the initial portion of each pulse, an indication of the optical response characteristics of the sensing channel generating the pulse and embodying in a subsequent portion of each pulse an indication of the mark data contained on that portion of the document scanned. The initial portion of each pulse causes circuit 101 to generate an output voltage which is a function of the magnitude of the transition from level 71 to level 72 (FIG. 6a). The output from circuit 101 is used to control the gain of amplifier 100 in a manner which normalizes the outputs therefrom. Thus, for a sensing channel that has a low optical response level, circuit 101 produces a relatively small voltage level output that causes the gain of amplifier 100 to be raised to a level above that which would be set for a sensing channel having a relatively high optical response. Therefore, regardless of the optical response characteristics of the five different mark sensing channels employed in the scanner, the data-bearing portions of each sampling signal can be reliably compared against each other.

The output from amplifier 100 is transmitted through an analog switch 102 during the period of each SYNC pulse occurring during the READ GATE signal. Operation of the switch 102 is controlled by an AND circuit 103 which responds to the READ GATE and SYNC signals. The output from switch 102 is transmitted to an amplitude storage circuit 104 and to a threshold circuit 105. The former circuit provides a D.C. output signal W which corresponds to the maximum positive level of the signal passed by switch 102. Threshold circuit 105 compares the amplitude of the signal passed by switch 102 against a fixed voltage level called the mark width threshold. So long as the level of the data signal is above the threshold, circuit 105 generates an output that causes a ramp generator 106 to produce a linearly rising voltage level. When the data signal drops below the threshold, comparator 105 turns ramp generator 106 off and the output thereof is restored to a predetermined starting level. An amplitude storage circuit 107 generates an output signal X which corresponds to the maximum level reached by the output from ramp generator 106. The signal X is used to control the gain of a variable gain D.C. amplifier 108 which is connected to amplify the output signal W from amplitude storage circuit 104. The gain control input to amplifier 108 is clamped by a diode 109 to a fixed positive voltage called the multivibrator threshold level. The gain of amplifier 108 remains constant so long as the amplitude of signal X is lower than the multiplier threshold level. However, as soon as the level of X increases above that of the threshold, the gain of amplifier 108 increases in accordance with signal X and amplifier 108 enhances the signal W.

The output from amplifier 108 is a signal Y which is fed to a pair of analog switches 110 and 111. Switch 110 is closed by timing signal A to transmit signal Y to a comparator 113. Switch 111 is closed during the period of the timing signal B to transmit the signal Y to the input of an amplitude store circuit 112.

Comparator 113 compares signal Y with the output signal Z from amplitude storage circuit 112 during A time and generates an output signal DM which is positive if the signal Y is greater than the signal Z. The output signal Z from circuit 112 is set to a reference level called the minimum mark threshold at the beginning of the sampling of each row of response positions on the document. At B time switch 111 presents the signal Y to the circuit 112 and the signal Z is increased to the level of Y if Y is greater than Z. Amplitude storage circuits 104 and 107 are reset to predetermined reference levels by timing signal C following each data signal. Peak sensing and storage circuit 101 is reset to a predetermined reference level by timing signal A following each data signal.

Figure 12:
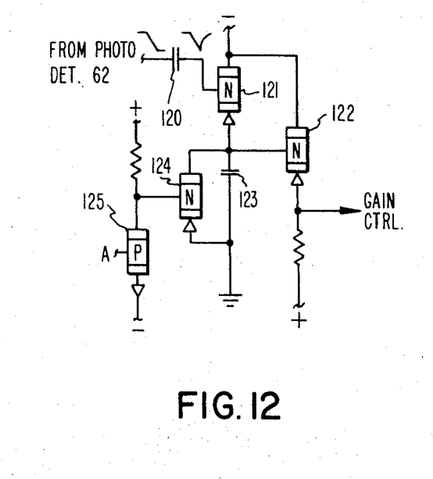
FIG. 12 is a schematic diagram showing one type of amplitude storage circuit utilized in the mark detecting circuit of FIG. 8.

The detailed schematic of peak sensing and storage circuit 101 is shown in FIG. 12. The signal from photodetector 62 is fed to an input coupling capacitor 120 which is connected to the base of a transistor 121. A storage capacitor 123 is included in the emitter circuit of transistor 121 and an emitter follower output stage 122 is provided to transfer the potential stored by capacitor 123 to the gain control input of amplifier 100. A capacitor discharge switch comprising transistors 124 and 125 is operative in response to timing signal A to restore the charge level on capacitor 123 to ground.

Operation of the circuit is as follows. The initial negative transition in each data signal from photodetector 62 causes a negative spike to appear at the base of transistor 121. The amplitude of this spike is dependent upon the magnitude of the input transition, and transistor 121 is rendered conductive to an extent dependent upon the amplitude of this spike. During the negative going portion of this spike, transistor 121 is turned on and capacitor 123 charges to a level corresponding to the negative peak of the spike. Since the magnitude of the input transition which generated the spike at the base of transistor 121 is a function, as previously described, of the optical response characteristics of the sensing channel which generated the transition, the level of charge on capacitor 123 and therefore the magnitude of the gain control output from emitter follower 122 is a corresponding function of the channel response characteristics. As previously described, the gain control signal inversely controls the gain of amplifier 100 in order to normalize the data signals.

Figure 13:
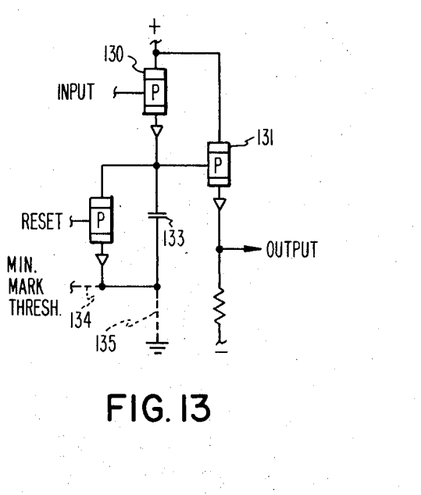
FIG. 13 is a schematic diagram illustrating other types of amplitude storage circuits employed in the circuit of FIG. 8.

The circuit details the amplitude storage circuits 104, 107 and 112 are shown in FIG. 13. These circuits are essentially positive peak sensing and each is constructed in accordance with the showing of FIG. 13. The circuit of FIG. 13 is constructed substantially identically to the circuit of FIG. 12 except that opposite transistor types are employed to enable positive operation. The input to the circuit is supplied to the base of an input transistor 130 having a storage capacitor 133 in its emitter circuit. A reset transistor 132 is coupled across capacitor 133 and is rendered conductive (in the case of circuits 104 and 107) by timing signal C following each data signal to restore capacitor 133 to ground, the connection 135 being employed for these two circuits. In the case of circuit 112, the END OF READ GATE signal renders transistor 132 conductive to charge transistor 133 to the level of the minimum mark threshold, the connection 134 being employed instead of the connection 135.

Any input signal which is more positive than the level stored on capacitor 133 causes transistor 130 to charge the capacitor to the level of the input. Input signals less positive than the level stored on capacitor 133 do not turn transistor 130 on and therefore do not affect the stored charge level. An emitter follower stage 131 is provided to transfer the stored level on capacitor 133 to the output circuit.

Figure 14:
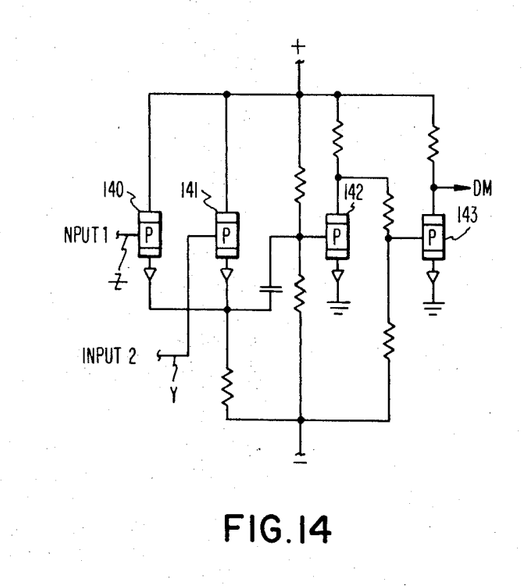
FIG. 14 is a schematic diagram showing the comparator circuit employed in the circuit of FIG. 8.

The circuit details of the comparator circuit 105 are shown in FIG. 14. A double emitter-follower comprising transistors 140 and 141 receives inputs from input lines 1 and 2, respectively. When the level on line 1 exceeds that on line 2, transistor 140 is conductive and transistor 141 is held off, its emitter voltage being substantially equal to that at input 1. Whenever line 2 rises above line 1, then transistor 141 turns on and causes 140 to be turned off. The voltage at the common emitter junction shifts positive and thus couples a positive spike through the capacitor to the base of output transistor 142. The latter is rendered conductive for a time dependent on the time constant of the input circuit, and the voltage at the collector of transistor 143 shifts positive for this period of time. This is the DM signal which is generated when the output Y from amplifier 108 (FIG. 8) is detected during A time to be greater than the output Z from storage circuit 112.

Figure 15:
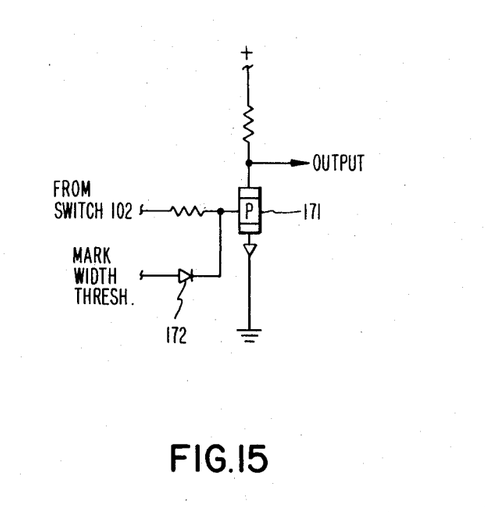
FIG. 15 is a schematic diagram showing the mark width threshold circuit of FIG. 8.

The details of threshold circuit 105 are shown in FIG. 15. The data signal from switch 102 is coupled to the base of a transistor 171. The mark width threshold voltage is connected to the base of 171 through a clamping diode 172. Thus, whenever the level of the data signal exceeds the threshold, diode 172 becomes reverse biased and transistor 171 conducts. This causes a negative transition to occur at the output. When the input drops below the threshold, the output returns positive.

Figure 11:
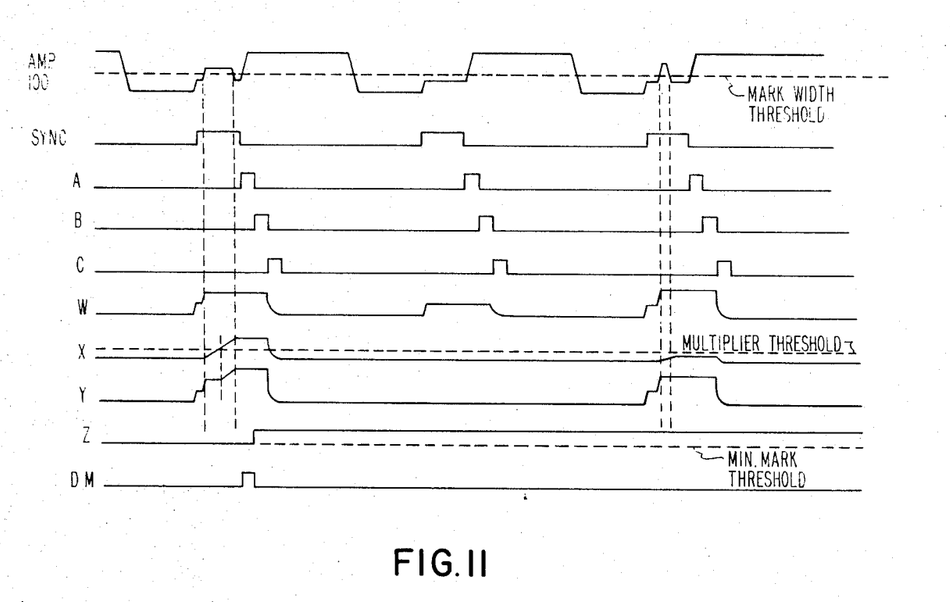
FIG. 11 is a waveform diagram illustrating the shape of certain signals generated by the mark detecting circuit of FIG. 8 and further illustrating the relationship between those signals and certain of the timing signals generated by the circuit of FIG. 7.

Operation of the overall mark detecting circuit is illustrated in the waveform diagram of FIG. 11. The top waveform illustrates the output from amplifier 100 during a time span which covers three successive data signals from the scanner. As shown, the first signal embodies a representation of a wide, not-so-dark mark, the second signal indicates that no mark was sensed and the third signal embodies a representation of a thin, dark mark. At the time of the first SYNC pulse, switch 102 is closed and the output signal from amplifier 100 is fed to the amplitude storage circuit 104 and threshold circuit 105. The output signal W from circuit 104 follows the input signal until the latter has reached its most positive level. Signal W thereafter remains stable at this peak value. In circuit 105 the data signal is compared against the mark width threshold which is shown superimposed on the amplifier output waveform. As denoted by the vertical dashed lines, circuit 105 generates an output signal whenever the level of the data signal exceeds that of the mark width threshold. The output from circuit 105 initiates ramp generator 106 which feeds its linearly increasing voltage level to amplitude storage circuit 107. As shown, the output signal X from this circuit follows the output of the ramp circuit until the latter reaches its most positive level. This level is stored in circuit 107.

The output signal Y from variable gain amplifier 108, follows the signal W until the gain control signal X exceeds the multiplier threshold. As X increases above the multiplier threshold, the gain of amplifier 108 is increased and output signal Y increases accordingly. The final level of signal Y is thus a function of both the signal W, which is representative of the reflectivity of the detected mark, and the signal X, which is representative of the width of the detected mark.

Upon termination of the SYNC signal, timing signal A closes switch 110 and transmits the signal Y to the input of comparator 113. Since Y is greater than the minimum mark threshold, which is present at output Z from amplitude storage circuit 112, comparator 113 generates a DM output signal.

At B time, switch 111 is closed and the signal Y is transferred to the input of amplitude storage circuit 112 whereupon output signal Z is increased a corresponding amount above the minimum mark threshold. At C time amplitude storage circuits 104 and 107 are reset whereupon the signals W, X and Y drop back to their initial reference levels.

During the next SYNC signal, the level of the data signal from amplifier 100 does not exceed the mark width threshold. Thus, threshold circuit 105 does not trigger the ramp circuit 106 and output X does not increase above its initial reference level. Output signal W follows the level of the data signal and amplifier 108 passes the signal W to its output Y without enhancement. When this signal Y is compared at A time with output Z no DM signal is generated by comparator 113 since Y is less than Z.

During the third SYNC signal, the length of time during which the data signal exceeds the mark width threshold is insufficient to cause the output signal X to rise above the multiplier threshold. Therefore, signal W, which has an amplitude representative of the peak positive level of the data signal occurring during the SYNC pulse is passed unenhanced by amplifier 108 to output Y. Since this signal Y is not quite as great as the level of output signal Z, comparator 113 again fails to generate a DM signal at A time. Also, at B time the level of signal Z is not changed.

The scanner output signals continue to be processed and compared in the above described manner for the remainder of the READ GATE signal. Each time output signal Y from amplifier 108 is detected to be greater than the signal Z, a DM output signal is generated. This indicates that the detected mark which caused the DM output response is the "most valid" mark which has been detected. At the termination of the READ GATE signal, after the row of response positions on the document has passed out of the view of the scanner, the END OF READ GATE signal resets amplitude storage circuit 112 and the mark detecting circuit is restored to its initial condition whereby it is prepared to repeat the above described mark detecting operation for the next row of response positions. It is to be noted that even though the first of the three data signals shown in FIG. 11 does not have an amplitude exceeding the amplitude of the mark represented in the third data signal, it was denoted the most valid signal due to its combined amplitude and width.

It should be understood that the exact setting of the multiplier threshold as well as the exact gain response of amplifier 108 to levels in the signal above the multiplier threshold must be determined individually for each different system. These parameters vary in accordance with the widest mark expected to be encountered, the darkest mark expected, etc. However, regardless of specific parameters, it is true that this mark detecting scheme will improve the accuracy of mark detection. Any student honestly attempting to make a "better" mark than he made previously in the same answer set will make the second mark either wider and at least as dark or darker and at least as wide as his first mark (or what is left thereof after erasure). In either case the system of the invention will detect the second mark as being most valid. In a system where reflectivity is the sole criteria of validity the second mark which is made wider and at least as dark as the first mark will not necessarily be identified as the most valid mark. Further, the multiplier threshold feature of the invention, by giving added emphasis to only those marks meeting a minimum width standard, increases still further the detection capacity of the system due to the fact that most erasures will fall below a predetermined width standard.

OUTPUT REGISTER

Figure 9:
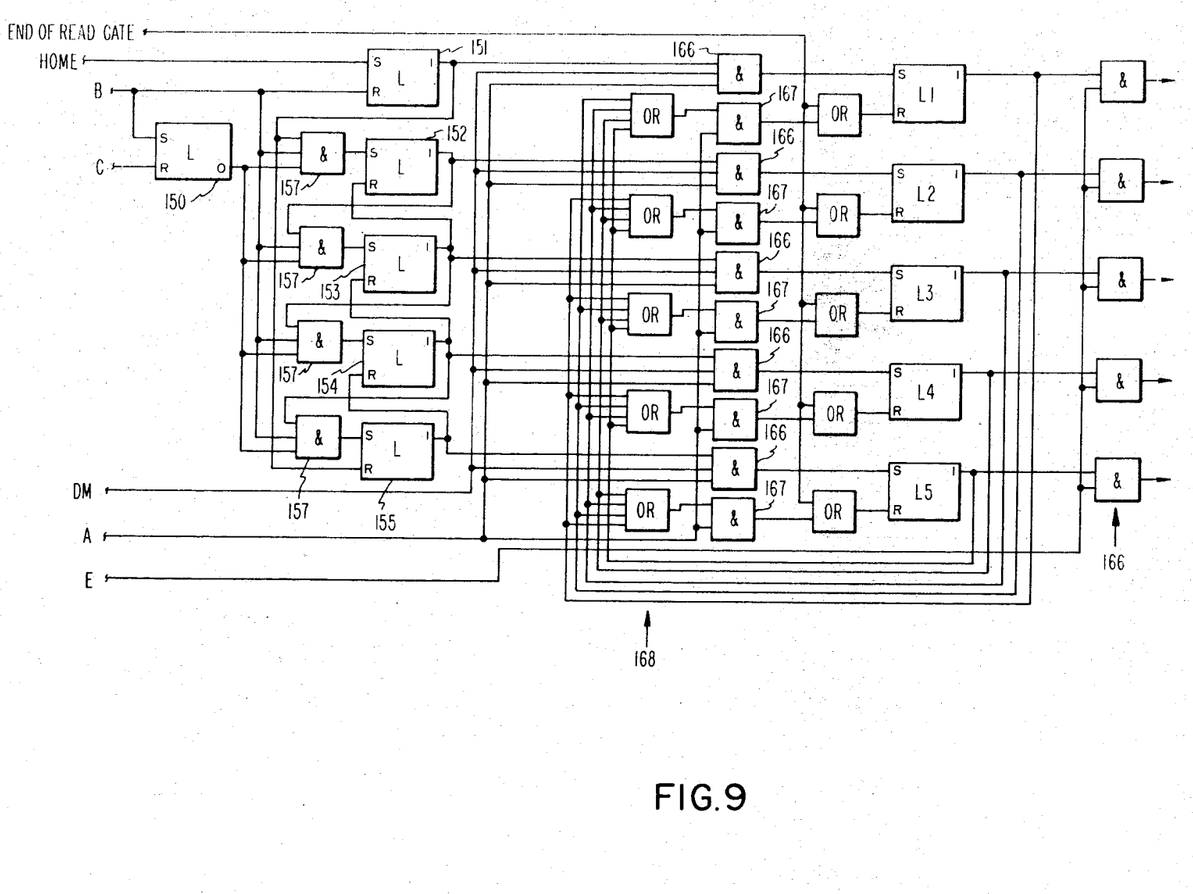
FIG. 9 is a schematic diagram of the output register circuit.

The details of the output register are shown in FIG. 9. The function of this circuit is to receive the DM signals from the mark detecting circuit and to generate an output signal which is indicative of the particular response position which caused the generation of the DM signal. The register includes a set of bistable latch circuits 150, 151, 152, 153, 154 and 155 which condition AND circuits 166 associated with the set inputs of storage latches L1, L2, L3, L4 and L5 in time with the sequence of data pulses generated by the scanner.

After each row of response positions has been scanned, the END OF READ GATE signal resets the storage latches L1–L5. The HOME signal preceding the END OF READ GATE signal sets latch 151 so that AND 166 associated with latch L1 is partially conditioned when the next SYNC pulse occurs. This SYNC pulse is, of course, associated with the sampling of the leftmost response position of the next row of response positions. If, during the A pulse following this SYNC signal a DM signal is generated, AND 166 associated with latch L1 is enabled whereby latch L1 is set. Setting of L1 causes latches L2–L5 to be reset through the OR circuits 168 and AND circuits 167 associated therewith.

The following B signal resets the timing latch 151 and causes latches 150 and 152 to become set. The setting of latch 152 partially conditions the AND 166 associated with storage latch L2. The next SYNC signal corresponds to the sampling of the response position which is second from the left on the document and if a DM signal is generated during the A time following this SYNC signal, latch L2 is set and latch L1 is rest through the OR circuit 168 and AND circuit 167 associated therewith. During the following B time, timing latch 153 is set and latch 152 is reset whereupon storage latch L3 is placed in condition to become set upon occurrence of a DM signal following the third SYNC pulse.

From the above it can be seen that the timing latches 150–155 sequentially condition the storage latches L1–L5 to be set in response to a DM signal generated after sampling of the response position corresponding to the respective storage latch. Storage latch L1 corresponds to the left-most response position, L2 to the response position which is second from left, and so on. The setting of each of the storage latches causes the resetting of the other four so that after the sampling of a row of response positions is completed, the storage latch corresponding to the response position containing the most valid mark is in a set condition while the remaining storage latches are in a reset condition. The E timing signal causes output AND circuits 166 to be partially conditioned at the end of the row sampling operation whereupon the AND 166 associated with the set storage latch gates a signal representative of the position of the most valid detected mark to external utilization circuits. Thereafter, the END OF READ GATE signal resets the storage latches, preparing the circuit for the next row of response positions.

OVERALL OPERATION

Referring to FIG. 10, a brief description is hereinafter given of the overall operation of the above-described embodiment. As the scanner shutter 30 (FIG. 3) rotates, the SYNC, A, B, C, D and HOME timing signals are generated in the sequence shown. The document is fed by feed rolls 46 (FIG. 3c) under the scanner and when a timing mark comes within the view of the timing channel of the scanner, pulses begin emanating from pulse shaper 81 (FIG. 7). The first of these timing mark pulses initiates a signal from singleshot 83 and when the latter output coincides with the HOME signal, the READ GATE signal is issued from singleshot 85.

The READ GATE signal enables the activation of switch 102 (FIG. 8) so that the data portions of the signals from amplifier 100 are passed to the mark detecting circuit. Thereafter, for the remainder of the READ GATE signal, the mark detecting circuit generates an output signal DM each time a mark is detected to meet the mark detecting criteria previously described in connection with the mark detecting circuit. Each DM signal causes one of the storage latches L1–L5 of the output register circuit (FIG. 9) to become set and at the same time resets any other storage latch which may be set. At the completion of the READ GATE period a single storage latch representative of the position of the most valid mark detected in the row is in a set condition. At E time a signal representative of this particular storage latch is transmitted by AND circuits 166 and thereafter the storage latches are reset.

It is, of course, apparent that the external utilization means receiving the signals from output AND's 166 must relate the data signals generated thereby to a particular row of response positions on the document. This may be done through the use of, for example, a counter which is activated in response to each E signal.

While the invention has been particularly shown and described with reference to a preferred embodiment thereof, it will be understood by those skilled in the art that various changs in form and details may be made therein without departing from the spirit and scope of the invention.

I claim:

1. In an optical scanner employing a single light source and a single photodetector for scanning discrete areas on a surface, the combination comprising:
   a stationary cylinder positioned adjacent said surface;
   first and second light conducting channels extending from said light source into said cylinder and terminating in first and second openings in the side of said cylinder;
   third and fourth light conducting channels extending from said photodetector into said cylinder and terminating in openings in the side of said cylinder adjacent said first and second openings, respectively; and
   a second cylinder mounted to rotate about said stationary cylinder and having a plurality of apertures for intermittently permitting passage of light from said first channel to said third channel and from said second channel to said fourth channel via reflectance from said surface.

2. The optical scanner set forth in claim 1, wherein:
   said first and second light conducting channels extend into said stationary cylinder through one end thereof and said third and forth light conducting channels extend into said cylinder through the other end thereof.

3. In a mark sensing device including a scanner having mounted thereon a member with a predetermined value of an optical property, said scanner being adapted to sample both the condition of said member and the condition of discrete areas on a document, said scanner generating an output signal for each said document sample and generating an initial portion of said signal for said member sample; a variable gain amplifier connected to receive said output signals; and a control circuit responsive to said initial portion for controlling the gain of said amplifier in accordance with the condition of said initial signal portion, the improvement wherein said scanner comprises:
   a light source for illuminating said document and a photodetector arranged to receive light reflected from said document;
   a shutter member positioned between said light source and said document, said shutter member including a movable element having one or more scanning apertures, said apertures being aligned so as to pass between said light source and said document as said element moves, whereby said photodetector receives document-reflected light when an aperture passes between said light source and said document and receives light reflected from said member when an aperture is not passing between said source and said document; and means for operating said shutter member to cause said photodetector to receive intermittent bursts of document reflected light;

and wherein said member with a predetermined value of an optical property comprises a reflective substrate mounted on said element adjacent each said aperture, said substrate being disposed such that movement of said element causes each said output signal to include an initial portion representative of the reflectivity of said substrate and a later portion representative of the reflectivity of the area of said document exposed by said aperture.

4. In a mark sensing device including a scanner having mounted thereon a member with a predetermined value of an optical property, said scanner being adapted to sample both the condition of said member and the condition of discrete areas on a document, said scanner generating an output signal for each said document sample and generating an initial portion of said signal for said member sample; a variable gain amplifier connected to receive said output signals; and a control circuit responsive to said initial portion for controlling the gain of said amplifier in accordance with the condition of said inital signal portion, the improvement wherein said scanner comprises:

a light source and a photodetector;

a stationary cylinder positioned adjacent said document;

first and second light conducting channels extending from said light source into said cylinder and terminating in first and second openings in the side of said cylinder;

third and fourth light conducting channels extending from said photodetector into said cylinder and terminating in openings in the side of said cylinder adjacent said first and second openings, respectively; and a second cylinder mounted to rotate about said stationary cylinder and having a plurality of apertures for intermittently permitting the passage of light from said first channel to said third channel and from said second channel to said fourth channel via reflectance from said surface.

References Cited

UNITED STATES PATENTS

| | | | |
|---|---|---|---|
| 3,060,329 | 10/1962 | Harrison et al. | 307—231 |
| 3,088,665 | 5/1963 | Branscomb et al. | 235—61.115 |
| 3,146,422 | 8/1964 | Grenais et al. | 235—61.115 X |
| 3,192,390 | 6/1965 | Ressler. | |
| 3,201,569 | 8/1965 | Connon | 235—61.7 |
| 3,393,800 | 7/1968 | Durand | 250—227 X |
| 3,408,482 | 10/1968 | Busby | 235—61.603 |

OTHER REFERENCES

Thorpe: "Optical Scanner," IBM Technical Disclosure Bulletin, vol. 4, No. 7, December 1961.

MAYNARD R. WILBUR, Primary Examiner

T. J. SLOYAN, Assistant Examiner

U.S. Cl. X.R.

250—227; 340—380; 356—71